United States Patent [19]

Baker

[11] E Re. 29,675

[45] Reissued Jun. 20, 1978

[54] O-(HALOPHENYLCARBAMYL)-N-(HALOPHENYL) GLYCOLAMIDES

[75] Inventor: Don R. Baker, Orinda, Calif.

[73] Assignee: Stauffer Chemical Company, Westport, Conn.

[21] Appl. No.: 816,226

[22] Filed: Jul. 18, 1977

Related U.S. Patent Documents

Reissue of:

[64] Patent No.: 3,859,332
Issued: Jan. 7, 1975
Appl. No.: 348,448
Filed: Apr. 5, 1973

[51] Int. Cl.[2] ..... C07C 125/06
[52] U.S. Cl. ..... 560/31; 424/300
[58] Field of Search ..... 560/31

[56] References Cited

U.S. PATENT DOCUMENTS 3,772,386 11/1973 Hubele et al. ..... 560/31

*Primary Examiner*—Richard L. Raymond
*Attorney, Agent, or Firm*—Edwin H. Baker

[57] ABSTRACT

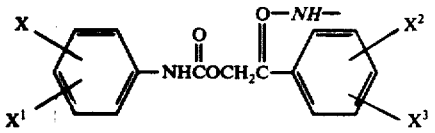

wherein X is chloro or bromo, $X^1$ is hydrogen, chloro or bromo, $X^2$ is chloro or bromo and $X^3$ is hydrogen chloro or bromo and their use as biocides.

7 Claims, No Drawings

O-(HALOPHENYLCARBAMYL)-N-(HALOPHENYL) GLYCOLAMIDES

Matter enclosed in heavy brackets [ ] appears in the original patent but forms no part of this reissue specification; matter printed in italics indicates the additions made by reissue.

This invention relates to certain novel O-(halophenylcarbamyl)-N-(halophenyl)-glycolamides and their use as biocides.

The compounds of this invention are represented by the following structural formula

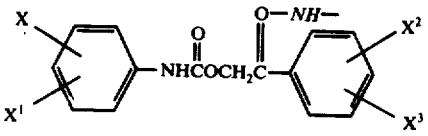

where X is chlorine or bromine, preferably chlorine; $X^1$ is hydrogen, chlorine or bromine, preferably hydrogen; $X^2$ is chlorine or bromine, preferably chlorine and $X^3$ is hydrogen, chlorine or bromine, preferably chlorine.

The compounds can be prepared by reacting the appropriate halophenyl glycolamide with the appropriate halophenylisocyanate in a suitable solvent such as acetone in the presence of a catalyst such as dibutyltin-dilaurate. The reaction readily proceeds at reflux temperature and the reaction product can be recovered by conventional means.

Preparation of the compounds of this invention is illustrated by the following specific example.

Example I

O-(3-Chlorophenylcarbamyl)-N-(3,4-dichlorophenyl)-glycolamide

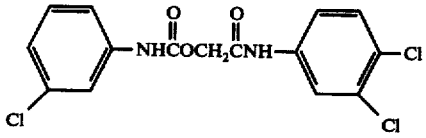

22.0 g. (0.10 mole) 3,4-dichlorophenylglycolamide, 100 ml. dry acetone, 12.4 ml. m-chlorophenylisocyanate, 4 drops dibutyl tin dilaurate are mixed in the order indicated. The reaction is exothermic to 34° C. After one hour the solution is refluxed on a steam bath for 10 minutes. The reaction mixture is evaporated in vacuo to yield an oil. The oil is diluted with 100 ml. chloroform and crystallization is initiated by seeding. The solid product is recovered by filtration, washed with chloroform and dried in vacuo to yield 40 g. of the desired product, m.p. 86°–88° C. The structure is confirmed by I.R. and nmr.

The following is a Table of certain selected compounds that are preparable according to the procedures described heretofore. Compound numbers are assigned to each compound and are used throughout the remainder of the specification.

TABLE I

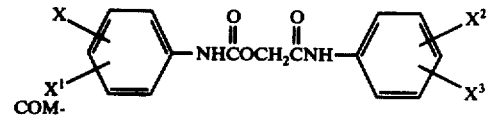

| COMPOUND NUMBER | X | $X^1$ | $X^2$ | $X^3$ | m.p. |
|---|---|---|---|---|---|
| 1. | 4-Cl | H | 3-Cl | 4-Cl | 170–173° C. |
| 2. | 3-Cl | H | 3-Cl | 4-Cl | 86–88° C. |
| 3. | 3-Cl | H | 4-Cl | H | 128–130° C. |
| 4. | 3-Cl | 4-Cl | 4-Cl | H | 176–178° C. |
| 5. | 3-Cl | 4-Cl | 3-Cl | 4-Cl | 115–116° C. |
| 6. | 3-Br | H | 3-Cl | 4-Cl | 185–187° C. |

In Vitro Vial Test

The following test illustrates utility of the compounds in controlling bacteria. This test measures the bactericidal properties of a compound when in contact with a growing bacterium. The test is conducted by partially filling a 1-ounce vial with nutrient broth. Next the test compound is added to the vial at a certain concentration, expressed in parts per million, and mixed with the broth. A water suspension of cells of staphylococcus aureus is added. The vial is then sealed and incubated for one week. Table II shows the results of various compounds tested by the In Vitro Vial Test.

TABLE II

| Concentration (PPM) Which Inhibited Growth | |
|---|---|
| COMPOUND NUMBER | STAPHYLOCOCCUS AUREUS |
| 1. | 0.25 |
| 2. | 0.25 |
| 3. | 5 |
| 4. | 1 |
| 5. | 1 |
| 6. | 0.5 |

As can be seen by the test results, the compounds find particular utility as bactericides. The compounds can be applied in a variety of ways at various concentrations. They can be combined with suitable carriers and applied as dusts, sprays, or drenches. The amount applied will depend on the nature of the organism to be controlled.

In Vitro Agar Screening Tests

This test measures the bactericidal, fungicidal and algaecidal properties of a compound when in contact with growing bacteria, fungi or algae in an artifical medium. The test is conducted by adding 20 ml. portions of a suitable warm sterile agar solution into 20 × 100 mm. Petri dishes. Then, the test compound, in 0.5 percent acetone solution, is added to the Petri dishes at levels of 1, 10 and 50 μg/ml. and mixed with the warm mobile agar solution. The treated agar mixture is then allowed to come to room temperature and solidify. Cells of the chosen organism are streaked on the surface of the solidified agar and are then incubated for such lengths of time that untreated samples containing no toxicant show luxurious growth typical of the particular organism. This time varies from 24 hours to one week depending on the particular organism. The fungi are incubated at 30° C. and the bacteria are incubated at 37° C. The algae are incubated at room temperature under artificial light. Nutrient agar is used as the medium in this test for the bacteria. Potato dextrose agar is used as the medium for the fungi with the exception of Trichophyton mentagrophytes for which Emmons agar is used. A modified Jack Meyers agar is used for the growth of the algae.

The extent of growth is noted at the end of the incubation period.

Representative organisms used in this test are as follows:

Bacteria
Enterobacter aerogenes
Bacillus cereus
Brevibacterium ammoniagenes
Staphylococcus aureus
Fungi
Aspergillus oryzae
Trichophyton mentagrophytes
Algae
Seenedesmus obliquus

TABLE III

In Vitro Agar Screening Tests
Minimum Inhibitory Concentration. μg/ml.

| | | COMPOUND NUMBER | |
|---|---|---|---|
| | | 1. | 2. |
| Bacteria | | | |
| | Enterobacter aerogenes | 1 | (1) |
| | Bacillus cereus | (1) | 1 |
| | Brevibacterium ammoniagenes | 5 | 5 |
| | Staphylococcus aureus | 1 | 1 |
| Fungi | | | |
| | Aspergillus oryzae | 5 | >50 |
| | Trichophyton mentagrophytes | 5 | (5) |
| Algae | | | |
| | Scenedesmus obliquus | 1 | (10) |

( ) indicates partial control at this concentration
>greater than

Sulfate Reducing Bacteria In Vitro Test

This test measures the bactericidal properties of a compound when in contact with a sulfate reducing bacteria, specifically Desulfovibrio desulfuricans. The test is conducted by dissolving the test compound in acetone to give an 0.5 percent solution. This toxicant is added to vials containing sterile Sulfate API broth with tryptone under anaerobic conditions at such levels to give final toxicant concentrations of 1, 5, 10 and 50 μg/ml. of solution. An inoculant solution of 0.5 ml of the growing organism, Desulfovibrio desulfuricans, is added to the vials followed by sufficient sterile distilled water to give a total of 10 ml. of solution in the vials. The vials are incubated at room temperature for 3 to 5 days until untreated controls shows growth of the organism as indicated by the black color development in the vials.

The following is a summary of the minimum inhibitory concentration necessary to control the organism.

TABLE IV

| | COMPOUND NUMBER | |
|---|---|---|
| | 1. | 2. |
| Desulfovibrio desulfuricans | 50 | 10 |

The compounds of this invention are generally embodied into a form suitable for convenient application. For example, the compounds can be embodied into pesticidal compositions which are provided in the form of emulsions, suspensions, solutions, dusts and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc, upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition; for example, an emulsion, suspension, or aerosol spray. While the concentration of the active pesticide in the present compositions can vary within rather wide limits, ordinarily the pesticide compound will comprise not more than about 15.0 percent by weight of the composition. Preferably, however, the pesticide compositions of this invention will be in the form of solutions or suspensions containing about 0.1 to 1.0 percent by weight of the active pesticide compound.

What is claimed is:

1. [The] *A* compound having the formula

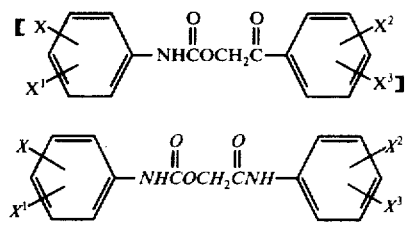

wherein X is chlorine or bromine; $X^1$ is hydrogen, chlorine or bromine; $X^2$ is chlorine or bromine; and $X^3$ is hydrogen, chlorine or bromine.

2. The compound of claim 1 in which X is chlorine, $X^1$ is hydrogen, $X^2$ is chlorine and $X^3$ is chlorine.

3. The compound of claim 1 in which X is 4-chloro, $X^1$ is hydrogen, $X^2$ is 3-chloro and $X^3$ is 4-chloro.

4. The compound of claim 1 in which X is 3-chloro, $X^1$ is hydrogen, $X^2$ is 3-chloro and $X^3$ is 4-chloro.

5. The compound of claim 1 in which X is 3-chloro, $X^1$ is 4-chloro, $X^2$ is 4-chloro and $X^3$ is hydrogen.

6. The compound of claim 1 in which X is 3-chloro, $X^1$ is 4-chloro, $X^2$ is 3-chloro and $X^3$ is 4-chloro.

7. The compound of claim 1 in hich X is 3-bromo, $X^1$ is hydrogen, $X^2$ is 3-chloro and $X^3$ is 4-chloro.

* * * * *

UNITED STATES PATENT AND TRADEMARK OFFICE

CERTIFICATE OF CORRECTION

PATENT NO. : Re. 29,675

DATED : June 20, 1978

INVENTOR(S) : Don R. Baker

It is certified that error appears in the above-identified patent and that said Letters Patent are hereby corrected as shown below:

ABSTRACT Formula should read:

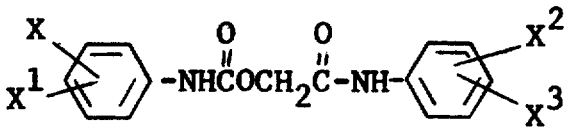

Column 1, line 20, formula should read:

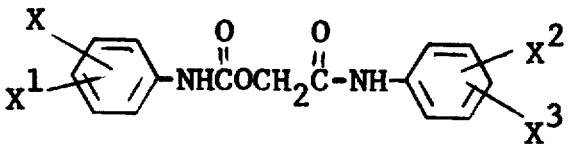

UNITED STATES PATENT AND TRADEMARK OFFICE

CERTIFICATE OF CORRECTION

PATENT NO. : Re. 29,675

DATED : June 20, 1978

INVENTOR(S) : Don R. Baker

It is certified that error appears in the above-identified patent and that said Letters Patent are hereby corrected as shown below:

Column 3, line 16, "Seenedesmus obliquus" should read "Scenedesmus obliquus".

Column 4, Claim 7, line 64, "hich" should read "which".

Signed and Sealed this

*Fourth* Day of *September 1979*

[SEAL]

*Attest:*

*Attesting Officer*

LUTRELLE F. PARKER

*Acting Commissioner of Patents and Trademarks*